W. L. HARRISON.
MECHANISM FOR TRANSMITTING ROTARY MOTION.
APPLICATION FILED FEB. 18, 1910.

978,371.

Patented Dec. 13, 1910.

2 SHEETS—SHEET 1.

Witnesses:

Inventor
Wm L. Harrison
By his Attorney
John Lotka

W. L. HARRISON.
MECHANISM FOR TRANSMITTING ROTARY MOTION.
APPLICATION FILED FEB. 18, 1910.

978,371.

Patented Dec. 13, 1910.

2 SHEETS—SHEET 2.

Witnesses:

Inventor
William L. Harrison
By his Attorney
John Lotka

UNITED STATES PATENT OFFICE.

WILLIAM L. HARRISON, OF BRANFORD, CONNECTICUT.

MECHANISM FOR TRANSMITTING ROTARY MOTION.

978,371. Specification of Letters Patent. Patented Dec. 13, 1910.

Application filed February 18, 1910. Serial No. 544,547.

*To all whom it may concern:*

Be it known that I, WILLIAM L. HARRISON, a citizen of the United States, and resident of Branford, in the county of New Haven and State of Connecticut, have invented certain new and useful Improvements in Mechanism for Transmitting Rotary Motion, of which the following is a specification.

My invention relates to an improved form of epicyclical gearing to enable large powers to be safely and efficiently transmitted with a high ratio of difference between the angular velocities of the driving member and the driven member respectively.

The particular object of my improvement is the provision of simplified, durable and reliable means for balancing centrifugal forces which have interfered with the practical success of most mechanisms of this type proposed hitherto.

The invention is applicable particularly as a speed-reducing gearing interposed between a steam-turbine and the shaft of driven mechanism, and depends upon the same principle as the invention disclosed in Harvey D. Williams' Letters Patent No. 908,529, dated January 5, 1909, but I have introduced certain alterations with the object of simplifying the construction and rendering it more reliable in operation.

I will now proceed to describe one of the forms in which my invention may be embodied, with reference to the accompanying drawings, in which—

Figure 1:
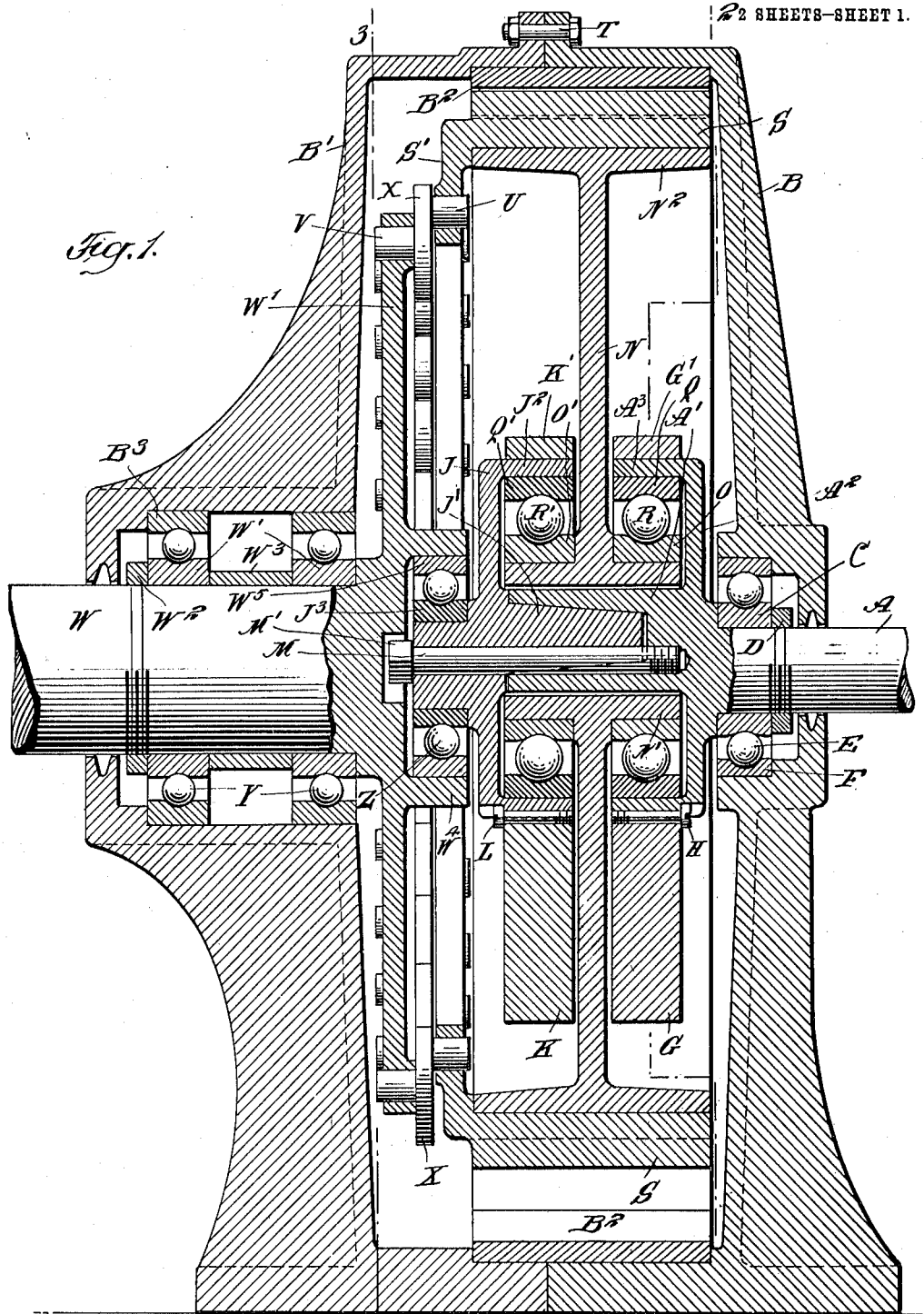
Figure 2:
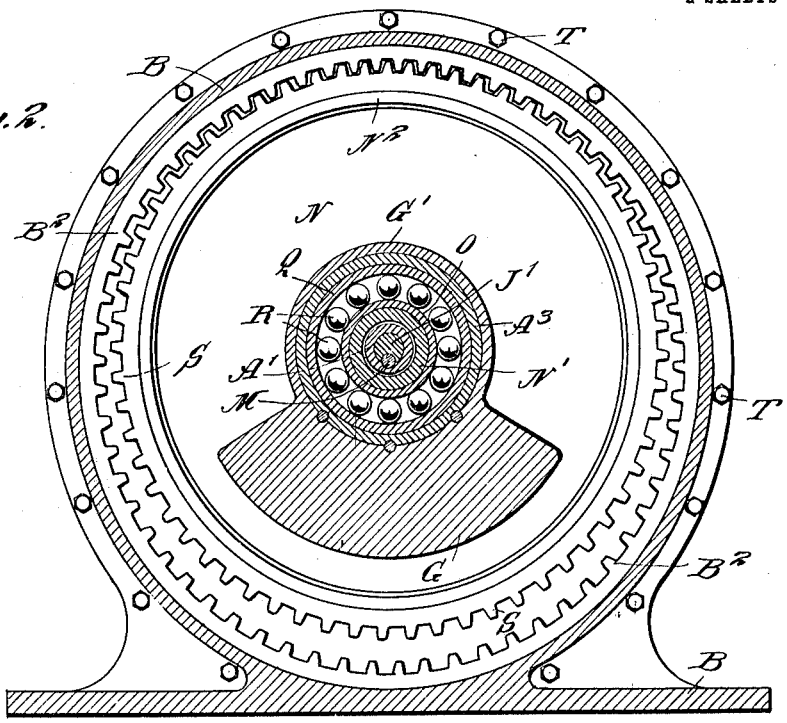
Figure 3:
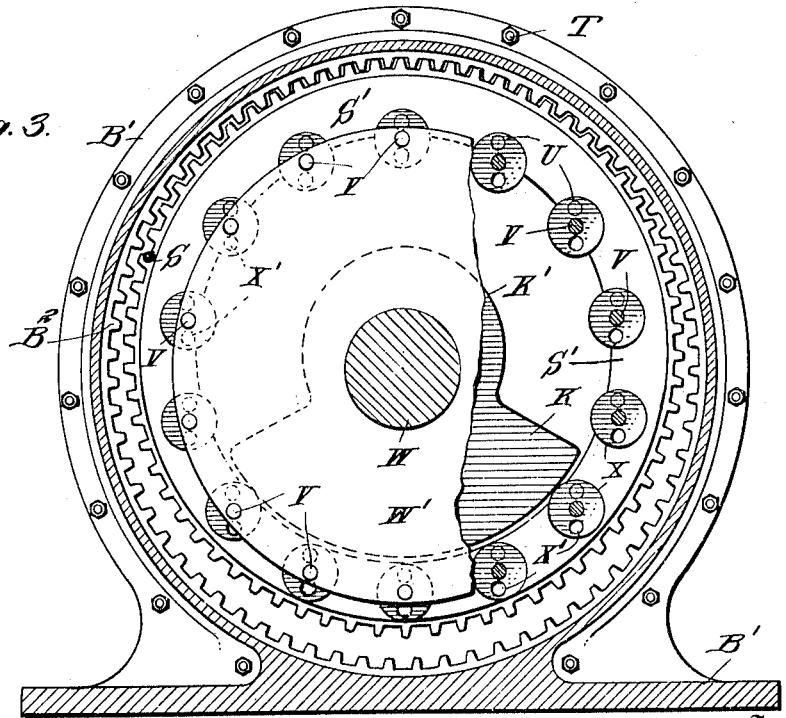

Figure 1 is a longitudinal vertical section of the improved mechanism; Fig. 2 is a cross-section on line 2—2 of Fig. 1; and Fig. 3 is a cross-section on line 3—3 of Fig. 1, with parts broken away.

A designates the drive shaft, for instance the high-speed shaft of a steam turbine. This shaft is connected rigidly, or made integral, with an offset or crank pin $A^1$ and with a cup comprising a web $A^2$ and a cylindrical flange $A^3$ concentric with the crank pin. The shaft is journaled in suitable bearings of the casing B, $B^1$, for instance a collar C may be held against a shoulder of the shaft by a nut D fitted to a screw-threaded portion of the shaft, said collar forming a race for balls E which also engage a stationary race F. The cup flange $A^3$ is encircled by a band $G^1$ extending from a counterweight G which is located diametrically opposite the crank pin $A^1$. Suitable means are employed to hold the counterweight against movement both lengthwise of the shaft and circumferentially thereof; for instance, as shown, screws H, parallel with the shaft, may be arranged to screw partly into the outer surface of the flange $A^3$ and partly into the inner surface of the counterweight. The crank pin $A^1$ is provided with a longitudinal recess, open at one end, and preferably widened conically toward said end, into which extends the similarly formed projection $J^1$ of a cup comprising a web J and a flange $J^2$. This flange is in line with the flange $A^3$, but spaced therefrom, and is connected with a counterweight K (having a band $K^1$) by means of screws L, in the same manner as described with reference to the counterweight G.

The cup J, $J^2$ is connected with the shaft rigidly as by means of a key-bolt M screwing into the crank pin $A^1$ and provided with a head $M^1$ to press the cup inward, a portion of said bolt lying partly in a recess in the outer surface of the conical projection $J^1$ and partly in a recess in the inner surface of the crank pin cavity. The two cups $A^2$, $A^3$ and J, $J^2$ and the crank pin $A^1$ are thus held to rotate in unison with the drive shaft A.

Into the space between the inner edges of the flanges $A^3$, $J^2$ projects the web N of an eccentric wheel having a hub $N^1$ and outwardly presented ball races O, $O^1$ (these might be integral with the wheel). The axis of the wheel is at the center of the crank pin $A^1$, but this pin is not relied upon as a support for the wheel, a space being left (as shown in Figs. 1 and 2) between the outer surface of the crank pin $A^1$ and the inner surface of the hub $N^1$, so as to avoid friction. The wheel is supported by means of balls R, $R^1$ interposed between the outwardly presented surfaces of the races O, $O^1$ and the inwardly presented faces of races Q, $Q^1$ secured rigidly to the cup flanges $A^3$, $J^2$ or integral therewith. At its periphery the web N carries a rim $N^2$ with which is connected rigidly the externally toothed ring S meshing, at a point in radial line with the crank pin $A^1$, with the internally toothed ring $B^2$ suitably secured to the frame, as by clamping it between the frame sections B, $B^1$ by means of bolts and nuts T. The ring $B^2$ is concentric with the shaft.

At the side farthest away from the shaft A, the eccentric wheel is provided with an inwardly extending flange S¹ provided with a series of studs U parallel with the axis and arranged in a circle whose center is upon the axis of the wheel. These studs (rigid with the flange S¹) correspond in number and location to a similar series of studs V rigid with a web W¹ integral (as shown) with the driven shaft W. The shafts W and A are in axial alinement, and the circle in which the studs V are arranged has its center upon the common axis of the two shafts. The connection of the eccentric wheel with the driven shaft is made through links X, pivotally connected with the pairs of studs U and V. In the drawings, each link consists of a circular plate having a central aperture for the stud V and two diametrically opposite apertures at a distance from the center of the link equal to the eccentricity of the crank pin A¹, or in other words, to the eccentricity of the eccentric wheel. One of these diametrically opposite apertures receives the stud U, the other aperture X¹, being provided simply to distribute the weight of the swinging link symmetrically so as to obtain a perfect balance.

The shaft W is journaled in the frame section B¹ by means of ball races W¹ held in a position by a nut W² and a distance collar W³, said races being engaged by balls Y bearing against stationary races B³. At its inner end the shaft W has a cylindrical flange W⁴ with a race W⁵ on its inner surface, which engages balls Z in contact with a race J³ on the cup web J.

I have shown balls at the places where it is desired to reduce the friction, but it will be understood that other means may be employed as equivalents for the same purpose, particularly rollers.

It will be understood that as the drive shaft A revolves, the eccentric bearing members or races Q, Q¹ will cause the eccentric wheel to roll on the stationary internal track B², the said wheel thus having not only a bodily movement (its center describing a circle about the axis of the shaft) but further a rotary movement about its own axis, eccentric to that of the shaft. The driven shaft W thus rotates at a lower rate of speed than the shaft A (and in the opposite direction); with the proportions shown, the ratio would be 1 to 10. This ratio is determined as the quotient of the eccentricity of the wheel (or in other words, its throw) divided by the pitch radius of the eccentric gear S. As the wheel revolves bodily about the axis of the drive shaft A, centrifugal force is set up tending to press the gear or ring S radially outward against the stationary ring or track B² at the point of mesh (that is, toward the top in Fig. 1). Since the counterweights G, K, are diametrically opposite to the crank pin A¹ and consequently to the meshing point of the gears S, B², the centrifugal force of said weights is exerted in a direction opposite to that of the wheel, so as to neutralize said force, if the parts are properly dimensioned. With the arrangement shown, the centrifugal force of the wheel and of the counterweights will exert pressure on the inwardly presented bearing members or races Q, Q¹ of the shaft and on the outwardly presented tracks or races O, O¹ of the wheel, the center of pressure, or point of maximum pressure, lying in the same plane (passing through the shaft), with the meshing point of the gears S, B², and on the same side of the shaft axis as the crank pin A¹ (that is, at the top of the races, in the position Fig. 1.)

The improved construction disclosed herein is strong and durable, readily assembled and dismembered, and will run smoothly and with little noise. It will of course be understood that the parts will have to be properly proportioned and balanced in order to secure the best results.

I desire it to be understood that the gearing may be arranged and altered in various ways without departing from the nature of my invention as set forth in the appended claims. Thus, other means than shown may be employed to connect the eccentric wheel with the driven shaft.

I claim as my invention:

1. The combination of a stationary internally toothed gear, an externally toothed gear in mesh therewith and adapted to roll thereon, the second-named gear being eccentric with reference to the first, means for driving the eccentric gear, an outwardly presented or convex bearing member connected with said eccentric gear, a counterweight connected with said driving means and having its center of gravity held on the side of the stationary gear's axis opposite to the center of gravity of the eccentric gear, the centrifugal force of said counterweight being exerted upon said convex bearing member, and means for transmitting the motion of the eccentric gear to a driven member.

2. The combination of a stationary internally toothed gear, an externally toothed gear in mesh therewith and adapted to roll thereon, the second-named gear being eccentric with reference to the first, means for driving the eccentric gear, an outwardly presented or convex bearing member connected with said eccentric gear, a counterweight rotatable about the axis of the stationary gear and having its center of gravity held on the side of the stationary gear's axis opposite to the center of gravity of the eccentric gear, an inwardly presented or concave bearing member connected with the counterweight, the centrifugal force of said counterweight being exerted upon said bearing members, which adjoin each other, and means for transmitting the motion of the eccentric gear to a driven member.

3. The combination of a stationary internally toothed gear, an externally toothed gear eccentric thereto and in mesh therewith, means for driving the eccentric gear, an outwardly presented or convex race connected with the eccentric gear and concentric therewith, a counterweight rotatable about the axis of the stationary gear and having its center of gravity held on the side of the stationary gear's axis opposite to the center of gravity of the eccentric gear, an inwardly presented or concave race connected with the counterweight and surrounding said convex race concentrically, bearing balls interposed between said races, and means for transmitting the motion of the eccentric gear to a driven member.

4. The combination of the drive shaft, two spaced, alining concave bearing members connected with said shaft and arranged eccentrically thereto, counterweights connected with said shaft and disposed on the side of the axis opposite to the center of said bearing members, an eccentric externally toothed gear having a web arranged between the said bearing members, convex bearing members carried by said web and surrounded by said concave bearing members concentrically, a stationary internally toothed gear having its center upon the axis of the shaft and meshing with said eccentric gear, and means for transmitting the motion of the eccentric gear to a driven member.

5. The combination of the drive shaft, two spaced, alining concave races connected with said shaft and arranged eccentrically thereto, counterweights connected with said shaft and disposed on the side of the axis opposite to the center of said races, an eccentric externally toothed gear having a web arranged between the said races, convex races carried by said web and surrounded by said concave races concentrically, bearing balls interposed between said races, a stationary internally toothed gear, in mesh with the eccentric gear and having its center upon the axis of the shaft, and means for transmitting the motion of the eccentric gear to a driven member.

In testimony whereof, I have signed this specification in the presence of two subscribing witnesses.

WILLIAM L. HARRISON.

Witnesses:
   Jos. R. Stein,
   John Lotka.